(12) United States Patent
Rodrigues et al.

(10) Patent No.: US 11,662,611 B2
(45) Date of Patent: May 30, 2023

(54) TUNABLE OPTICAL METAMATERIAL HAVING ELECTROACTIVE POLYMER METASURFACES

(71) Applicant: Toyota Motor Engineering & Manufacturing North America, Inc, Plano, TX (US)

(72) Inventors: Sean P. Rodrigues, Ann Arbor, MI (US); Frederico Marcolino Quintao Severgnini, Ann Arbor, MI (US); Paul D. Schmalenberg, Pittsburg, PA (US)

(73) Assignee: Toyota Motor Engineering and Manufacturing North America, Inc., Plano, TX (US)

( * ) Notice: Subject to any disclaimer, the term of this patent is extended or adjusted under 35 U.S.C. 154(b) by 227 days.

(21) Appl. No.: 17/227,687

(22) Filed: Apr. 12, 2021

(65) Prior Publication Data

US 2022/0326552 A1 Oct. 13, 2022

(51) Int. Cl.
*G02F 1/01* (2006.01)

(52) U.S. Cl.
CPC ........ *G02F 1/0128* (2013.01); *G02F 2202/30* (2013.01); *G02F 2203/50* (2013.01)

(58) Field of Classification Search
CPC . G02F 1/0128; G02F 2202/30; G02F 2203/50
USPC .......................................................... 359/291
See application file for complete search history.

(56) References Cited

U.S. PATENT DOCUMENTS

| | | | |
|---|---|---|---|
| 9,377,629 B2 * | 6/2016 | Lee | H04N 13/305 |
| 2008/0218887 A1 | 9/2008 | Deutsch et al. | |
| 2010/0301971 A1 | 12/2010 | Yonak et al. | |
| 2014/0211298 A1 | 7/2014 | Sayyah et al. | |
| 2016/0103252 A1 | 4/2016 | Batchko et al. | |
| 2018/0275321 A1 | 9/2018 | Kamali et al. | |
| 2018/0292644 A1 | 10/2018 | Kamali et al. | |
| 2018/0364487 A1 | 12/2018 | Yeoh et al. | |

(Continued)

FOREIGN PATENT DOCUMENTS

KR 102143535 B1 8/2020

OTHER PUBLICATIONS

Zhang, Shuyan, "Reconfigurable Metasurfaces in the Infrared," Harvard University, Dec. 2017, 138 pages.

(Continued)

*Primary Examiner* — William Choi
(74) *Attorney, Agent, or Firm* — Jordan IP Law, LLC

(57) ABSTRACT

A tunable optical metamaterial system includes a tunable optical metamaterial, an actuator module to selectively activate the tunable optical metamaterial, and a control system to selectively control the actuator module. The tunable optical metamaterial includes a substrate composed at least in part of an electroactive polymer (EAP), and an optically active particle array that includes a plurality of optically active elongated members populated spaced apart on the substrate in two or more orientations to form confocal lenses that are optically responsive to the expansion of the substrate. The control module, is configured to control the optical properties of the tunable optical metamaterial by causing the electrical activation of the substrate via the actuator module to selectively expand the substrate in a manner that alters the spacing between the optically active elongated members.

20 Claims, 11 Drawing Sheets

(56) References Cited

U.S. PATENT DOCUMENTS

2020/0249396 A1    8/2020   Akselrod et al.
2020/0259307 A1    8/2020   Sharma et al.

OTHER PUBLICATIONS

Lee et al., "Metasurfaces-based imaging and applications: from miniaturized optical components to functional imaging platforms," Royal Society of Chemistry, Jan. 15, 2020, 21 pages.

She et al., "Adaptive metalenses with simultaneous electrical control of focal length, astigmatism, and shift," Science Advances, vol. 4, No. 2, Feb. 23, 2018, 8 pages.

\* cited by examiner

TUNABLE OPTICAL METAMATERIAL HAVING ELECTROACTIVE POLYMER METASURFACES

TECHNICAL FIELD

Embodiments relate generally to tunable optical metamaterials. The tunable optical metamaterials include optical metasurfaces combined with electroactive polymers to have integrated active electronic tuning.

BACKGROUND

Existing optical metamaterial designs fail to provide a built-in method and structure for active, electronic tuning.

BRIEF SUMMARY

In accordance with one or more embodiments, an example tunable optical metamaterial system comprises one or more of the following: a tunable optical metamaterial; an actuator module to selectively activate the tunable optical metamaterial; and a control system to selectively control the actuator module.

In accordance with one or more embodiments of the example tunable optical metamaterial system, the tunable optical metamaterial comprises a substrate having one or more electroactive surfaces and an optically active particle array comprising a plurality of optically active elongated members populated spaced apart on the electroactive surface.

In accordance with one or more embodiments of the example tunable optical metamaterial system, the substrate is composed at least in part of an electroactive polymer (EAP) that, when electrically activated by application of a predetermined voltage, is configured to expand from an inactive state to an active state and thereby induce an optical response from the optically active particle array, and when electrically deactivated by removal of the predetermined voltage, is configured to contract from the active state to the inactive state and thereby induce another optical response from the optically active particle array.

In accordance with one or more embodiments of the example tunable optical metamaterial system, the optically active elongated members are populated spaced apart on the electroactive surface in two or more orientations to form confocal lenses that are optically responsive to expansion and contraction by the substrate between the inactive state and the active state. Alternatively or additionally, the optically active elongated members are arranged in a repeating, lattice array.

In accordance with one or more embodiments of the example tunable optical metamaterial system, the actuator module comprises one or more electrical conductor members electrically coupled to the electroactive surface.

In accordance with one or more embodiments of the example tunable optical metamaterial system, the control module comprises one or more processors to execute a set of instructions to selectively control, by causing the actuator module to expand and contract the substrate between the active state and the inactive state, the optical properties of the tunable optical metamaterial in a manner that alters the spacing between two or more of the optically active elongated members.

In accordance with one or more embodiments of the example tunable optical metamaterial system, the control module comprises one or more processors to execute a set of instructions to selectively manipulate, by sending one or more control signals to the actuator, the shape of the substrate in a manner that alters the spacing between two or more of the optically active elongated members in thereby generating an optical response by the optically active particle array.

In accordance with one or more embodiments of the example tunable optical metamaterial system, the control module comprises one or more processors to execute a set of instructions to selectively cause, by transmitting one or more control signals to the actuator module, electrical activation of the substrate in a manner that induces a first optical response by the optically active particle array. Such electrical activation may induce expansion of the substrate.

In accordance with one or more embodiments of the example tunable optical metamaterial system, the control module comprises one or more processors to execute a set of instructions to selectively cause, by transmitting one or more second control signals to the actuator module, electrical deactivation of the substrate in a manner that induces a second optical response by the optically active particle array. Such electrical activation may induce contraction of the substrate.

In accordance with one or more embodiments of the example tunable optical metamaterial system, the one or more processors are to execute the set of instructions to selectively cause the one or more electrical conductor members to apply a predetermined voltage to the electroactive surface in a manner that electrically activates the substrate.

In accordance with one or more embodiments of the example tunable optical metamaterial system, the one or more processors are to execute the set of instructions to cause the one or more electrical conductors to apply a predetermined voltage to the electroactive surface in a manner that expands the substrate in one or more of a first direction and a second direction that is substantially perpendicular to the first direction.

In accordance with one or more embodiments of the example tunable optical metamaterial system, the substrate, when in the active state, expands in a direction dependent upon an orientation of the polymer fibers of the EAP.

In accordance with one or more embodiments of the example tunable optical metamaterial system, the optically active elongated members comprise one or more of metal resonator nanoparticles, inorganic resonator particles, and organic resonator particles.

In accordance with one or more embodiments of the example tunable optical metamaterial system, the optically active elongated members are populated on the electroactive surface in an asymmetric orientation.

In accordance with one or more embodiments of the example tunable optical metamaterial system, the optically active elongated members are populated on the electroactive surface in a symmetric orientation.

In accordance with one or more embodiments, a tunable optical metamaterial comprises one or more of the following: a substrate having an electroactive surface, composed of an electroactive polymer (EAP), configured to expand and contract in one or more directions between an inactive state and an active state; and an optically active particle array, comprising a plurality of optically active elongated members populated on the electroactive surface in two or more orientations to form confocal lenses that are optically responsive to expansion and contraction by the substrate.

In accordance with one or more embodiments of the tunable optical metamaterial, the substrate is electrically activated by application of a predetermined voltage to the electroactive surface.

In accordance with one or more embodiments of the tunable optical metamaterial, the substrate is electrically activated by application of a predetermined voltage to the electroactive surface in a manner that expands the substrate in one or more of a first direction and a second direction that is substantially perpendicular to the first direction.

In accordance with one or more embodiments of the tunable optical metamaterial, the substrate, when in the active state, expands in a direction dependent upon an orientation of the polymer fibers of the EAP.

In accordance with one or more embodiments of the tunable optical metamaterial, the optically active elongated members comprise one or more of metal resonator nanoparticles, inorganic resonator particles, and organic resonator particles.

In accordance with one or more embodiments of the tunable optical metamaterial, the optically active elongated members are populated on the electroactive surface in an asymmetric orientation.

In accordance with one or more embodiments of the tunable optical metamaterial, the optically active elongated members are populated on the electroactive surface in a symmetric orientation.

In accordance with one or more embodiments, a method of controlling a tunable optical metamaterial having a substrate having an electroactive surface, composed of an electroactive polymer (EAP), configured to expand and contract in one or more directions between an inactive state and an active state, and an optically active particle array comprising a plurality of optically active elongated members populated spaced apart on the electroactive surface in two or more orientations to form confocal lenses that are optically responsive to expansion and contraction by the substrate, the method comprising one or more of the following: selectively controlling, by causing expansion and contraction of the substrate between the active state and the inactive state, the optical properties of the tunable optical metamaterial in a manner that alters the spacing between two or more of the optically active elongated members.

In accordance with one or more embodiments of the method, the selective control of the optical properties comprises applying a predetermined voltage to the electroactive surface in a manner that electrically activates the substrate.

In accordance with one or more embodiments of the method, the selective control of the optical properties comprises applying a predetermined voltage to the electroactive surface in a manner that expands the substrate in a first direction.

In accordance with one or more embodiments of the method, the selective control of the optical properties comprises applying the predetermined voltage to the electroactive surface in a manner that expands the substrate in a second direction that is substantially perpendicular to the first direction.

In accordance with one or more embodiments of the method, the selective control of the optical properties comprises applying a predetermined voltage to the electroactive surface in a manner that simultaneously expands the substrate in a first direction and a second direction that is substantially perpendicular to the first direction.

In accordance with one or more embodiments of the method, the selective control of the optical properties comprises applying a predetermined voltage to the electroactive surface in a manner that electrically activates the substrate to expand in a direction dependent upon an orientation of the polymer fibers of the EAP.

In accordance with one or more embodiments, a computer program product for a tunable optical metamaterial having a substrate having an electroactive surface, composed of an electroactive polymer (EAP), configured to expand and contract in one or more directions between an inactive state and an active state, and an optically active particle array comprising a plurality of optically active elongated members populated spaced apart on the electroactive surface in two or more orientations to form confocal lenses that are optically responsive to expansion and contraction by the substrate, the computer program product comprising at least one computer readable medium comprising a set of instructions, which when executed by one or more processors, cause the one or more processors to: selectively control, by causing expansion and contraction of the substrate between the active state and the inactive state, the optical properties of the tunable optical metamaterial in a manner that alters the spacing between two or more of the optically active elongated members.

In accordance with one or more embodiments of the computer program, wherein the set of instructions, which when executed by the one or more processors, cause the one or more processors to: selectively control the optical properties by applying a predetermined voltage to the electroactive surface in a manner that electrically activates the substrate.

In accordance with one or more embodiments of the computer program, wherein the set of instructions, which when executed by the one or more processors, cause the one or more processors to: the selectively control the optical properties by applying a predetermined voltage to the electroactive surface in a manner that expands the substrate in a first direction.

In accordance with one or more embodiments of the computer program, wherein the set of instructions, which when executed by the one or more processors, cause the one or more processors to: selectively control the optical properties by applying the predetermined voltage to the electroactive surface in a manner that expands the substrate in a second direction that is substantially perpendicular to the first direction.

In accordance with one or more embodiments of the computer program, wherein the set of instructions, which when executed by the one or more processors, cause the one or more processors to: selectively control the optical properties by applying a predetermined voltage to the electroactive surface in a manner that simultaneously expands the substrate in a first direction and a second direction that is substantially perpendicular to the first direction.

In accordance with one or more embodiments of the computer program, wherein the set of instructions, which when executed by the one or more processors, cause the one or more processors to: selectively control the optical properties by applying a predetermined voltage to the electroactive surface in a manner that electrically activates the substrate to expand and contract in a direction dependent upon an orientation of the polymer fibers of the EAP.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1:
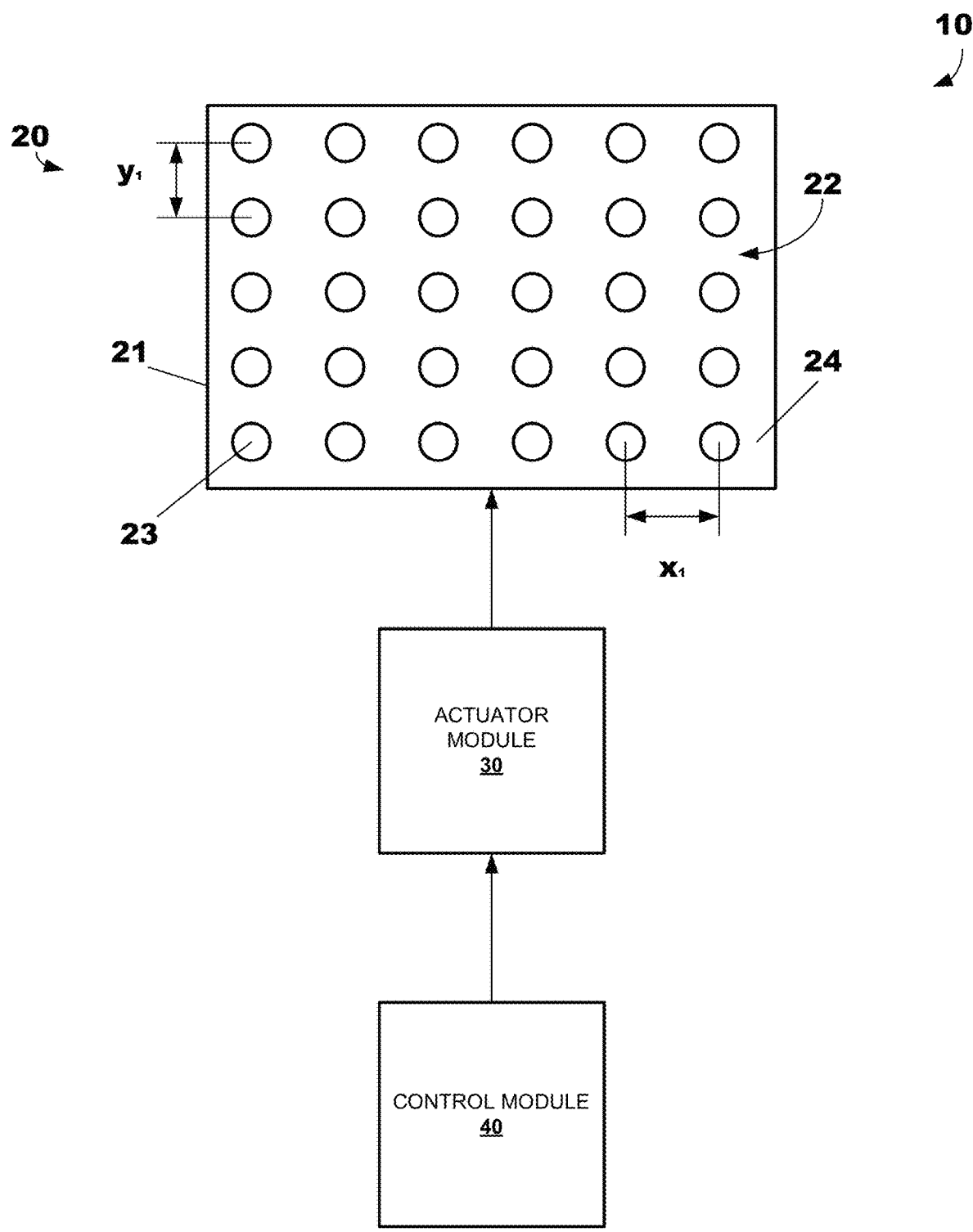
FIG. 1 illustrates an example tunable optical metamaterial system with the substrate in an inactive state, in accordance with one or more embodiments shown and described herein.
Figure 2:
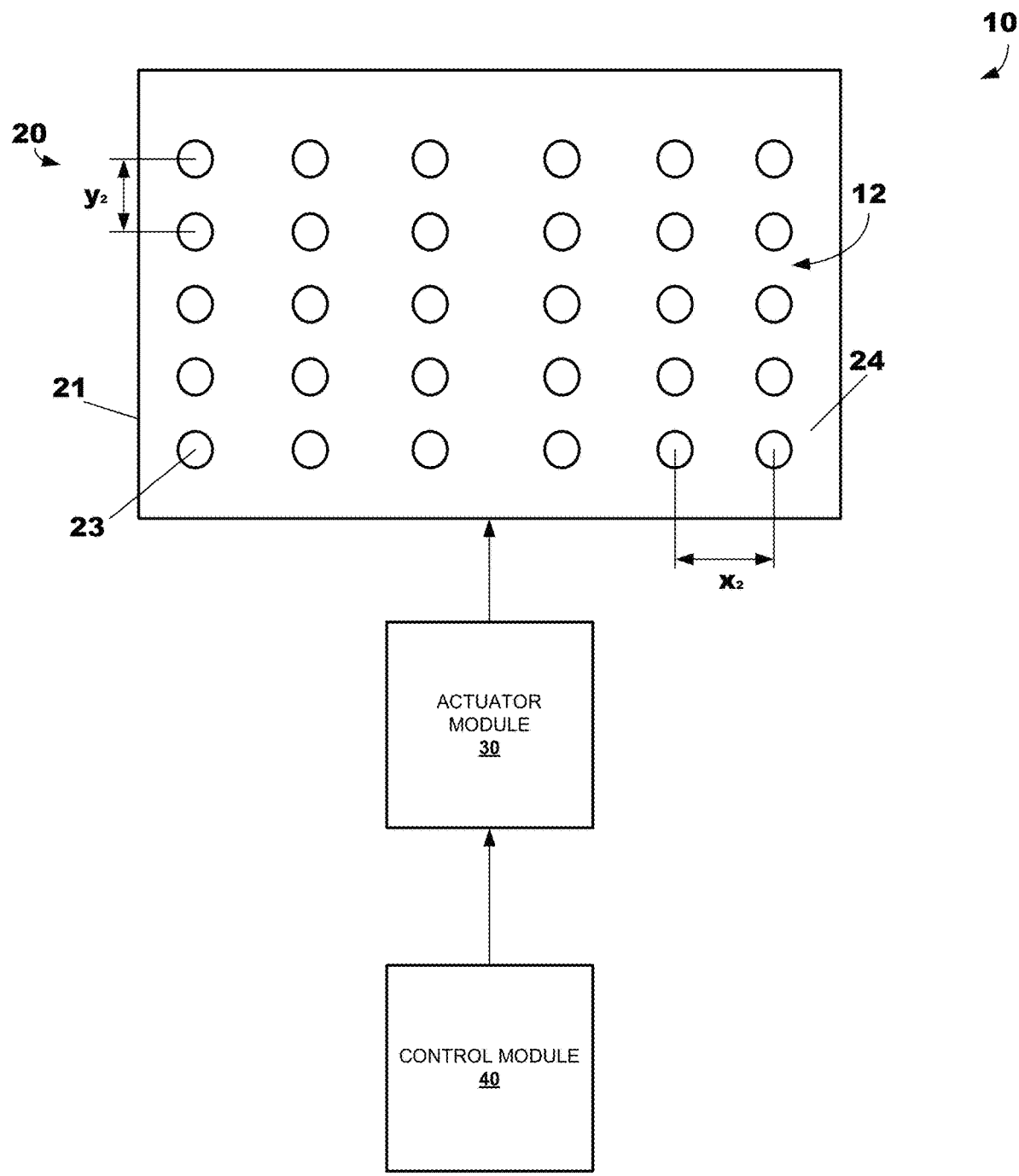
FIG. 2 illustrates the example tunable optical metamaterial system of FIG. 1, with the substrate in an active state.
Figure 3:
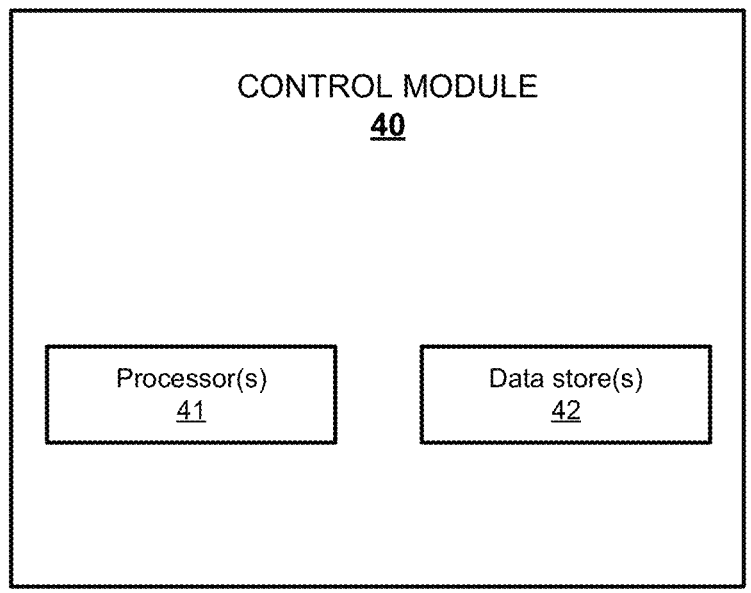
FIG. 3 illustrates an example control module of the example tunable optical metamaterial system of FIG. 1.

Turning to the figures, in which FIGS. 1 and 2 illustrates an example tunable optical metamaterial system 10 that may have application in a vehicle component, system, or subsystem. Embodiments, however, are not limited thereto, and thus, this disclosure contemplates the tunable optical metamaterial system 10 having non-mobility applications that fall within the spirit and scope of the principles of this disclosure.

In the illustrated example of FIGS. 1 and 2, the example tunable optical metamaterial system 10 comprises a tunable optical metamaterial 20, an actuator module 30 to selectively activate the tunable optical metamaterial 20, and a control module 40 to selectively control the actuator module 30.

In accordance with one or more embodiments, the tunable optical metamaterial 20 comprises a substrate 21 having one or more electroactive surfaces 24, and an optically active particle array 22 comprising a plurality of optically active structures in the form of elongated members 23 that are populated on the electroactive surface in a spaced-apart configuration. In the illustrated example, the one or more electroactive surfaces 24 upon which the optically active particle array 22 is arranged is substantially planar.

The substrate 21 is composed of a deformable and electroactive material such as, for example, a transparent electroactive polymer (EAP), such as, for example, Solvene® 200. The EAP polymer of the substrate 21 may be formed by a spin-coating technique, but embodiments are not limited thereto. This disclosure contemplates other suitable techniques that fall within the spirit and scope of the principles of this disclosure. For example, but not limited thereto, the substrate 21 may be formed by injection molding, casting, or a polymer thin film method.

The substrate 21 may have one or more electrical conductor members or electrodes arranged thereon or therein to establish one or more electrical interfaces between the substrate 21 and the actuator module 30. Such electrical interfaces are configured to facilitate electrical activation or stimulation of the substrate 21 by application of a predetermined voltage by the actuator module 30, is configured to expand and contract in one or more directions (e.g., an x direction, a y-direction, or a combination thereof).

Each optically active elongated members 23 comprises a metasurface that is configured to allow for phase control over light on the nanoscale. In accordance with one or more embodiments, the metasurface is formed from a cylinder. In accordance with one or more embodiments, the metasurfaces may be formed from high refractive index materials, such as, for example, $TiO_2$, $HfO_2$, and AlN. Such high refractive index materials may be deposited using atomic layer deposition (ALD) techniques, and can be etched via reactive ion etching (RIE) to obtain a pillar-like shape of the optically active elongated members 23.

In accordance with one or more embodiments, the metasurfaces comprise one or more metal resonator nanoparticles. Alternatively or additionally, the metasurfaces comprise one or more inorganic resonator particles. Alternatively or additionally, the metasurfaces comprise one or more organic resonator particles (e.g., such as PDTT: PSS). Embodiments, however, are not limited thereto, and thus, this disclosure contemplates the tunable optical metamaterial system 10 having non-mobility applications that fall within the spirit and scope of the principles of this disclosure.

The optically active elongated members 23 are populated spaced apart on the electroactive surface in two or more orientations to form confocal lenses that are optically responsive to expansion and contraction by the substrate between the inactive state and the active state. Alternatively or additionally, the optically active elongated members are arranged in a repeating, lattice array.

In accordance with one or more embodiments, the optically active elongated members 23 are populated on the electroactive surface 24 in a symmetric orientation in a manner such that each unit cell is spaced a lateral distance $x_1$ in the x-direction along the planar surface from a neighboring unit cell and vertical lateral distance $y_1$ in the y-direction along the planar surface from a neighboring unit cell. Alternatively, the optically active elongated members 23 are populated on the electroactive surface in an asymmetric orientation. The directional orientation of optically active elongated members 23 elicits nano-adjustments to an optical wavefront impinging on the electroactive surface 24. This is achieved due to the periodic unit cell having a size that is less than the operating wavelength of light, and the orientation of the optically active elongated members 23 relative to the polarization of the wave induces minute changes in phase while maintaining a macroscopic optical permittivity.

In accordance with one or more embodiments of the example tunable optical metamaterial system, the actuator module 30 comprises one or more electrical conductor members or electrodes electrically coupled to the corresponding one or more electrical conductors or electrodes at the electrical interface(s) with the substrate 21.

In accordance with one or more embodiments, the control module 40 comprises one or more processors 41. As set forth, described, and/or illustrated herein, "processor" means any component or group of components that are configured to execute any of the processes described herein or any form of instructions to carry out such processes or cause such processes to be performed. The processors 41 may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processors 41 may comprise at least one hardware circuit (e.g., an integrated circuit) configured to carry out instructions contained in program code. In embodiments in which there is a plurality of processors 41, such processors 41 may work independently from each other, or one or more processors may work in combination with each other. In accordance with one or more embodiments, the processors 41 may be a host, main, or primary processor of the system 10. For instance, the processors 41 may comprise an electronic control unit (ECU) of a vehicle.

In accordance with one or more embodiments, the control module 40 may comprise one or more data stores 42 for storing one or more types of data. The control module 40 may include interfaces that enable one or more systems thereof to manage, retrieve, modify, add, or delete, the data stored in the data stores 42. The data stores 42 may comprise volatile and/or non-volatile memory. Examples of suitable data stores 42 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data stores 42 may be a component of the processors 41, or alternatively, may be operatively connected to the processors 41 for use thereby. As set forth, described, and/or illustrated herein, "operatively connected" may include direct or indirect connections, including connections without direct physical contact.

In accordance with one or more embodiments, the one or more processors 41 are configured to execute a set of instructions (which may be stored in the one or more data stores 42) to selectively control the optical properties of the tunable optical metamaterial 20 in a manner that alters the spacing between two or more of the optically active elongated members 23. In particular, the one or more processors 41 are configured to transmit one or more control signals to activate the actuator module 30, which in turn causes the actuator module 30 to selectively apply a suitable voltage to the substrate 21 in manner which expands the geometric configuration, size, or square area of the substrate 21 from the inactive state to the active state, thereby generating an optical response by the optically active particle array 22.

For example, in the illustrated example of FIG. 2, a voltage selectively applied to the substrate 21 having a symmetrical arrangement of optically active elongated members 23 thereon causes an increase in the lateral distance (e.g., from $x_1$ to $x_2$) and the vertical distance (e.g., $y_1$ to $y_2$) between adjacent or neighboring optically active elongated members 23. When the electroactive polymer of the substrate 21 is stretched or expanded, spacing between optically active elongated members 23 in the optically active particle array 22 increases, thereby increasing the period of the optically active particle array 22. By increasing the period of the optically active particle array 22, resonance broadening also increases. This resonance shift illustrates the relationship between the period of the optically active particle array 22 and the optical properties of the tunable optical metamaterial 20. Indeed, the selective modification of the optically active particle array 22 may modify the wavelengths and intensity of light transmitted by the tunable optical metamaterial 20 (e.g., light that reflects of passes through the tunable optical metamaterial). Such selective modification may be obtained via one or more of: a selective application of a suitable voltage to the substrate 21, the shape and orientation of the polymer fibers of the electroactive surfaces 24, and the shape and orientation of particles of the optically active particle array 22.

In accordance with one or more embodiments, the one or more processors 41 may execute a set of instructions to transmit one or more control signals to the actuator module 30 to selectively cause electrical activation of the substrate 21 in a manner that induces an optical response by the optically active particle array 22. In particular, the one or more processors may execute the set of instructions to selectively cause the one or more electrical conductor members of the actuator module 30 to apply a predetermined voltage to the electroactive surface in a manner that electrically activates the substrate 21. Such electrical activation may induce expansion of the substrate 21 to an active state (FIG. 2). Such an active state may represent a maximum overall size of the substrate 21.

In accordance with one or more embodiments, while the electrical activation of the substrate 21 is maintained, the one or more processors may also execute a set of instructions to transmit one or more control signals to the actuator module 30 to selectively cause electrical deactivation of the substrate 21 in a manner that induces another optical response by the optically active particle array 22. Such electrical deactivation may induce contraction of the substrate 21 to the inactive state (FIG. 1). Such an inactive state may represent a minimum overall size of the substrate 21.

In accordance with one or more embodiments, while the electrical activation of the substrate 21 is maintained, the one or more processors may also execute a set of instructions to transmit one or more control signals to the actuator module 30 to selectively cause a reduction in the electrical activation (i.e., by reducing the applied voltage) of the substrate 21 in a manner that induces another optical response by the optically active particle array 22. Such reduction in electrical activation may induce expansion of the substrate 21 to an active state (FIG. 2). Such an active state may represent an overall size of the substrate 21 that is between the maximum overall size and the minimum overall size.

The application of a predetermined voltage to the electroactive surface 24 of the substrate 21 induces bidirectional or unidirectional expansion of the substrate 21 in a manner that causes an optical response by the optically active particle array 22. The bidirectional or unidirectional expansion of the substrate 21 can be dependent upon an orientation of the polymer fibers of the EAP. The application of a suitable voltage causes a shift in the optical properties of the optically active particle array 22, such as absorption and emission spectra.

Figure 4:
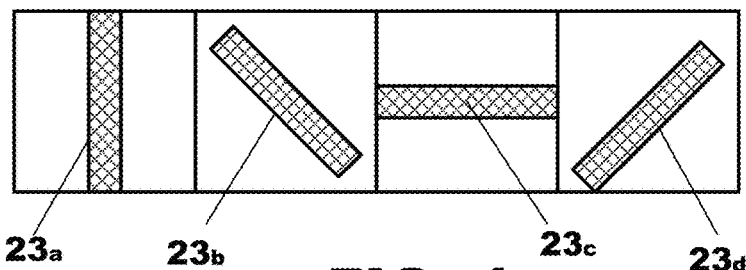
FIGS. 4 through 6 respectively illustrate the changes in focal length of optically active structures of an optically active particle array, in accordance with one or more embodiments shown and described herein.
Figure 5:
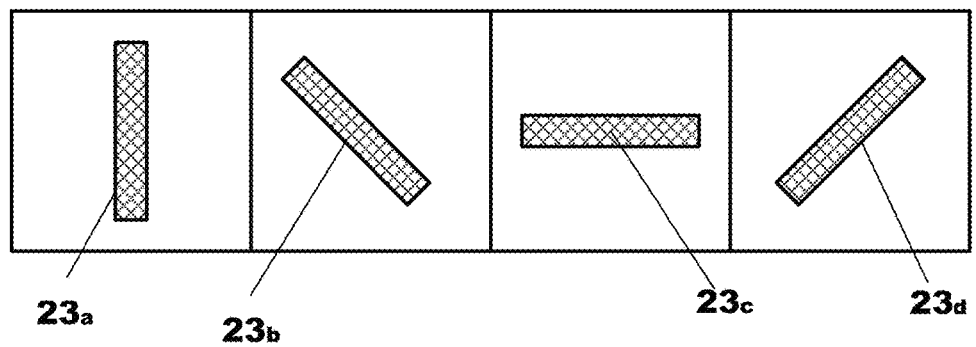
Figure 6:
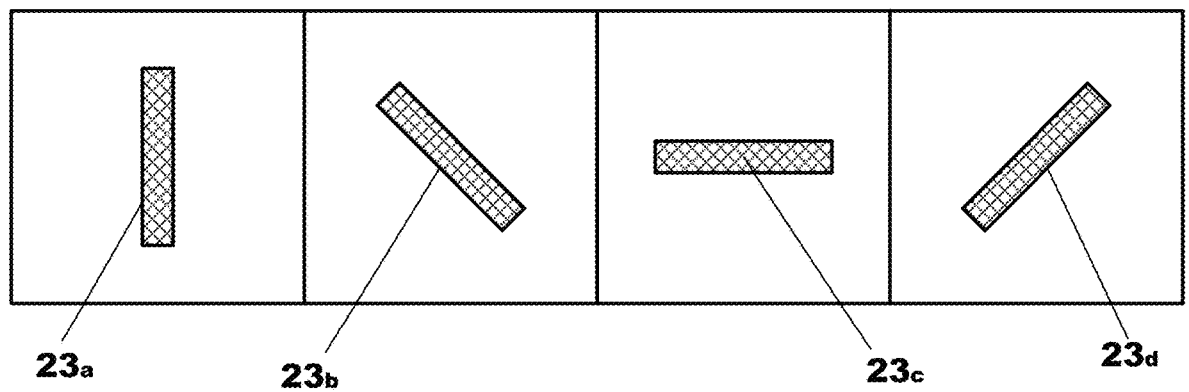

In the illustrated examples of FIGS. 4 through 6, the optically active elongated members 23a, 23b, 23c, 23d have different orientations such that, the bidirectional or unidirectional expansion and contraction of the substrate 21 causes an optical response that varies the focal length of the confocal lenses. In particular, the distance between the optically active elongated members 23a, 23b, 23c, 23d increase during expansion. The amount of expansion is generally in response to the applied voltage received by the substrate 21.

In the illustrated examples of FIGS. 7 to 11, a flowchart of methods 700, 800, 900, 1000, and 1100 of controlling a tunable optical metamaterial having a substrate having an electroactive surface, composed of an electroactive polymer (EAP), configured to expand and contract in one or more directions between an inactive state and an active state, and an optically active particle array comprising a plurality of optically active elongated members populated spaced apart on the electroactive surface in two or more orientations to form confocal lenses that are optically responsive to expansion and contraction by the substrate. In one or more examples, the respective flowcharts of the methods 700, 800, 900, 1000, and 1100 may be implemented by the one or more processors 41. For example, the one or more processors 41 are configured to implement the methods 700, 800, 900, 1000, and 1100 using logic instructions (e.g., software), configurable logic, fixed-functionality hardware logic, etc., or any combination thereof. In one or more examples, software executed by the control module 40 provides functionality described or illustrated herein. In particular, software executing by the one or more processors 41 is configured to perform one or more processing blocks of the methods 700, 800, 900, 1000, and 1100 set forth, described, and/or illustrated herein, or provides functionality set forth, described, and/or illustrated.

Figure 7:
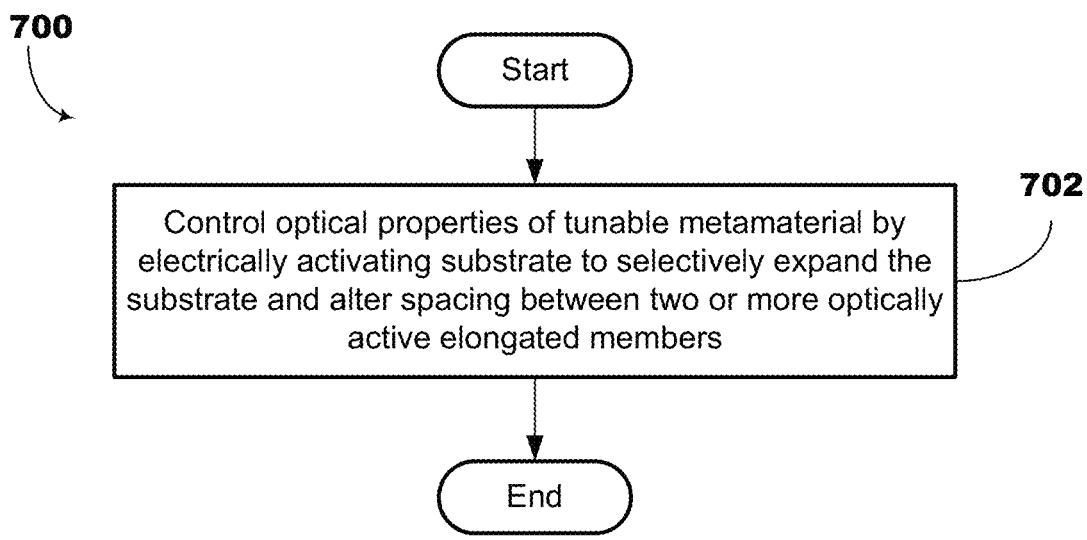
FIGS. 7 through 11 respectively illustrate a schematic diagram of example methods of controlling a tunable optical metamaterial, in accordance with one or more embodiments shown and described herein.

In the illustrated example of FIG. 7, illustrated process block 702 includes selectively controlling the optical properties of the tunable optical metamaterial in a manner that alters the spacing between two or more of the optically active elongated members. Such selective control comprises causing the expansion and contraction a substrate between the active state and the inactive state. The method 700 may terminate or end after execution of process block 702.

Figure 8:
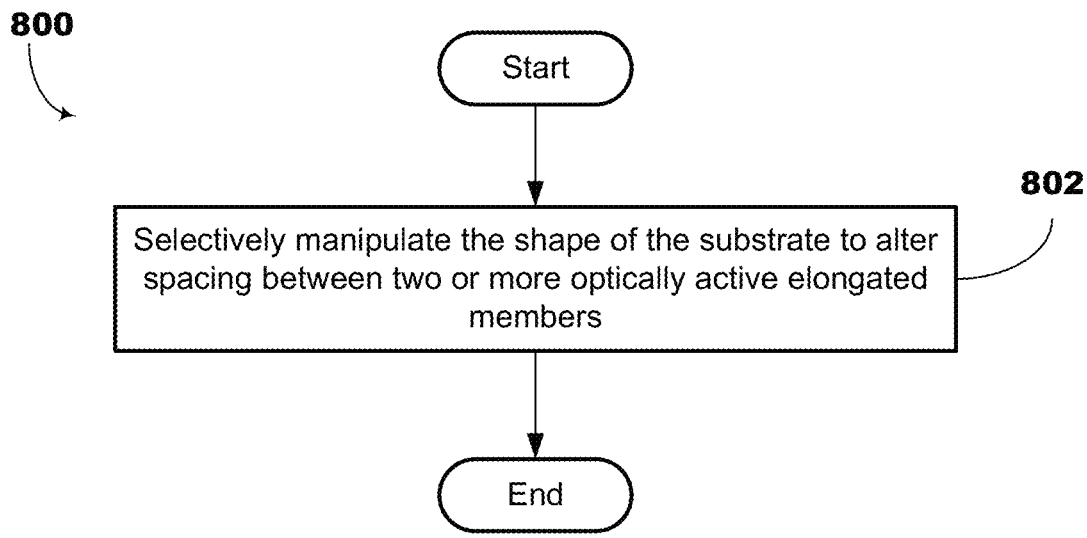

In the illustrated example of FIG. 8, illustrated process block 802 includes selectively manipulating the shape of the substrate in a manner that alters the spacing between two or more of the optically active elongated members in thereby generating an optical response by the optically active particle array. The method 800 may terminate or end after execution of process block 802.

Figure 9:
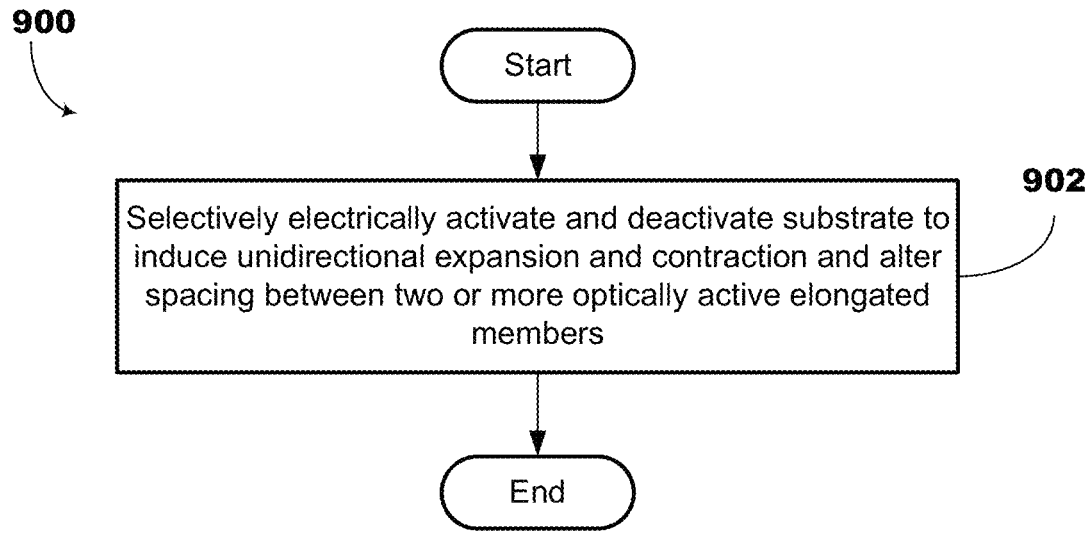

In the illustrated example of FIG. 9, illustrated process block 902 includes selectively electrically activating and deactivating the substrate to induce unidirectional expansion and contraction of the substrate in a manner that alters the spacing between two or more of the optically active elongated members to generate an optical response by the optically active particle array. The method 900 may terminate or end after execution of process block 902.

Figure 10:
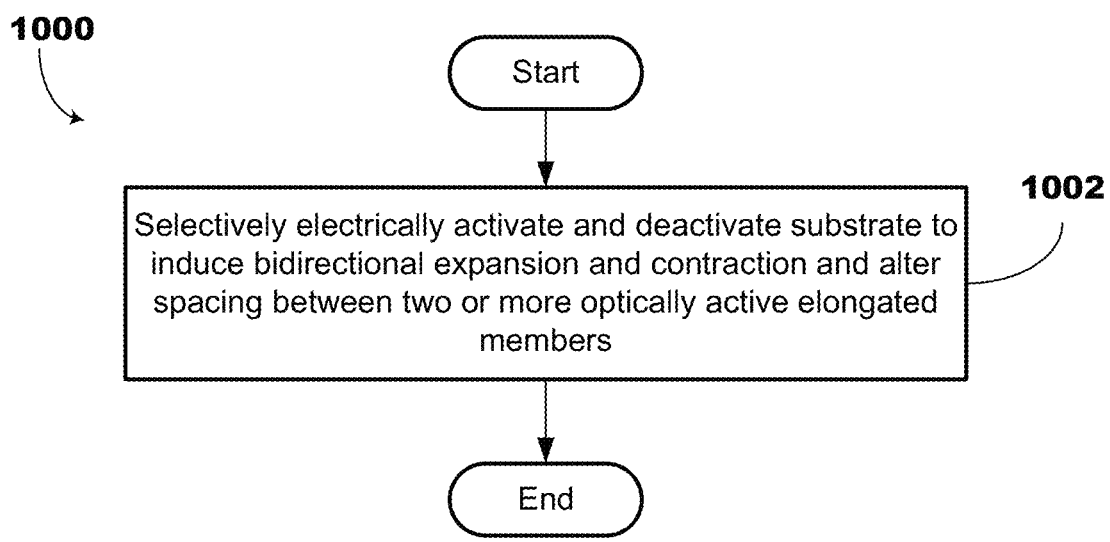

In the illustrated example of FIG. 10, illustrated process block 1002 includes selectively electrically activating and deactivating the substrate to induce bidirectional expansion and contraction of the substrate in a manner that alters the spacing between two or more of the optically active elongated members to generate an optical response by the optically active particle array. The method 1000 may terminate or end after execution of process block 1002.

Figure 11:
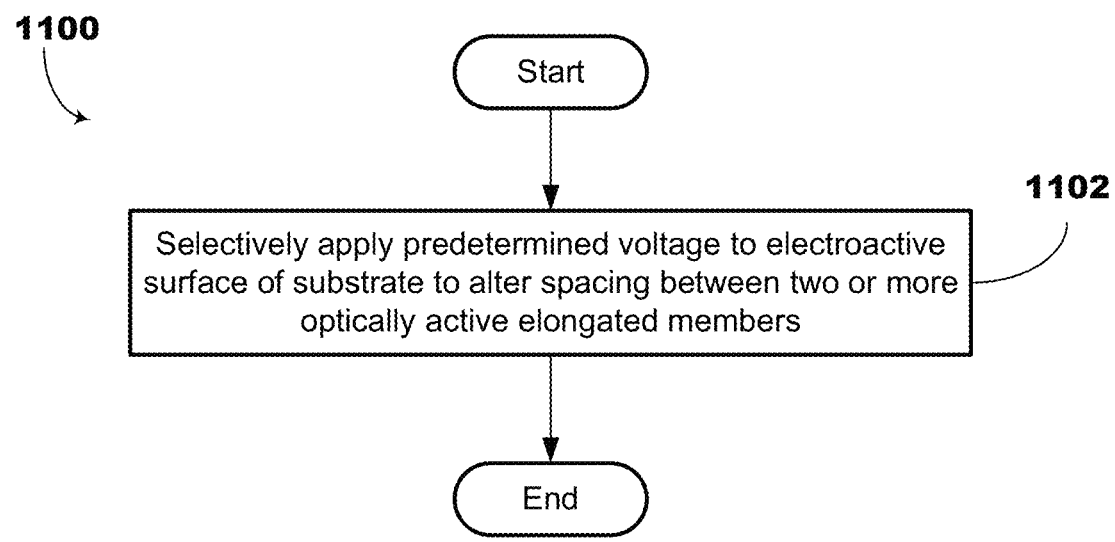
Figure 12:
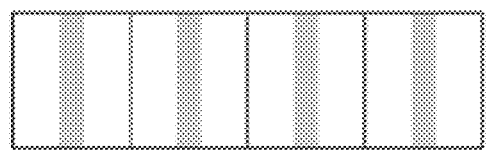
FIGS. 12 through 19 respectively illustrate example simulations of a relationship between the period of a metamaterial and the optical resonance of resonance particles of various wavelengths.
Figure 13:
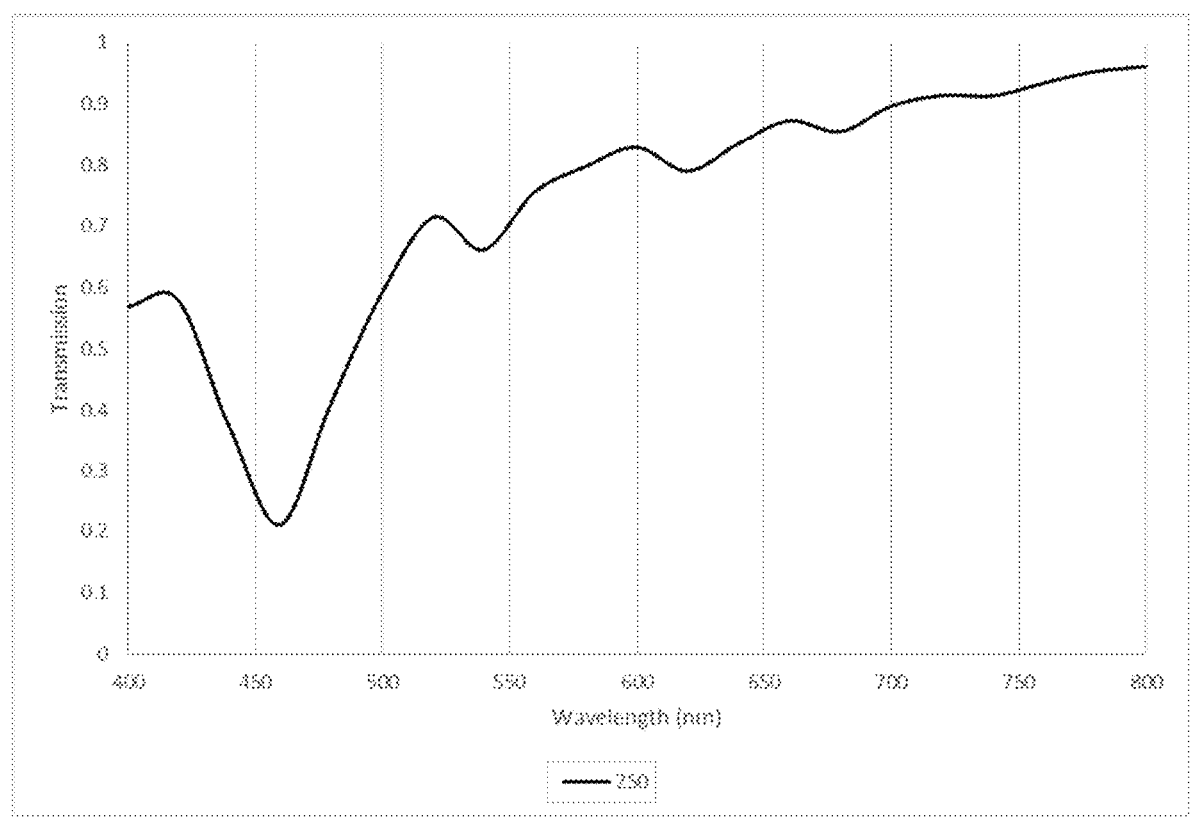
Figure 14:
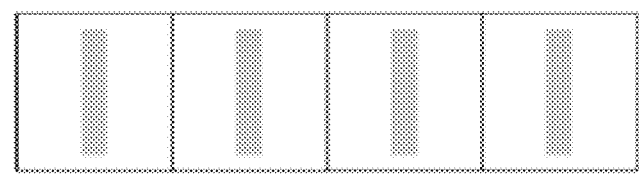
Figure 15:
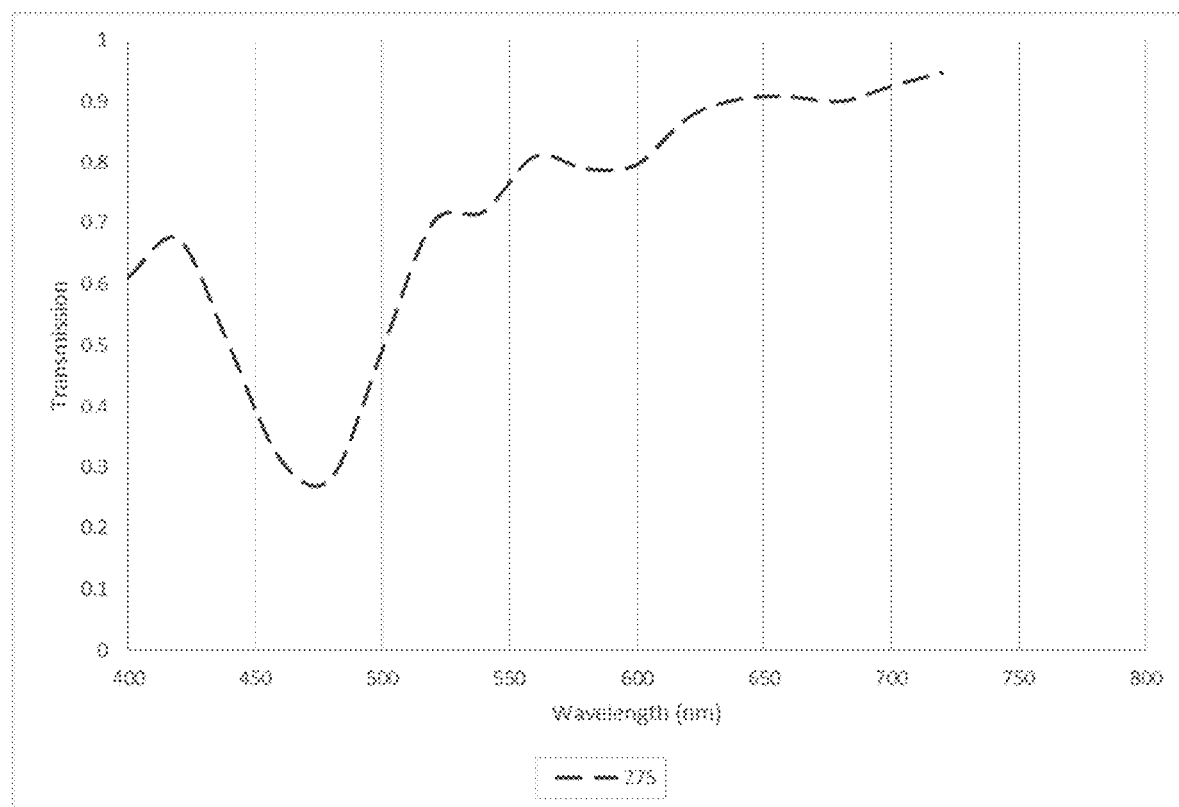
Figure 16:
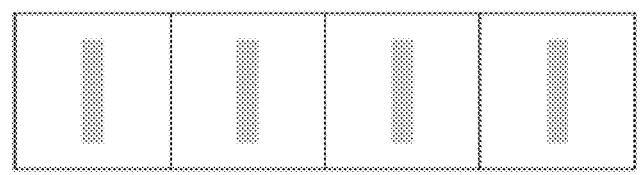
Figure 17:
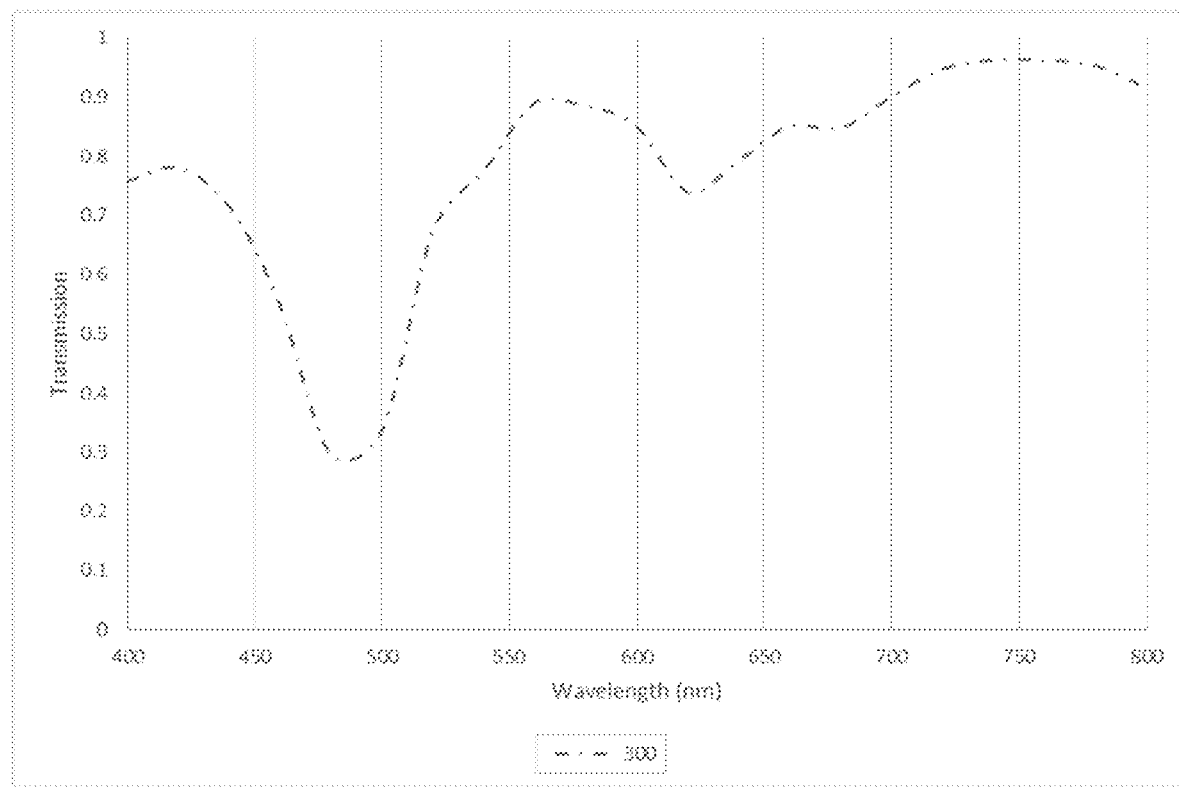

In the illustrated example of FIG. 11, illustrated process block 1102 includes selectively applying a predetermined voltage to the electroactive surface of the substrate in a manner that alters the spacing between two or more of the optically active elongated members to generate an optical response by the optically active particle array. The method 1000 may terminate or end after execution of process block 1102.

Figure 18:
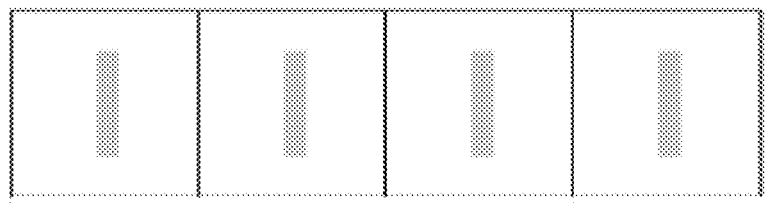
Figure 19:
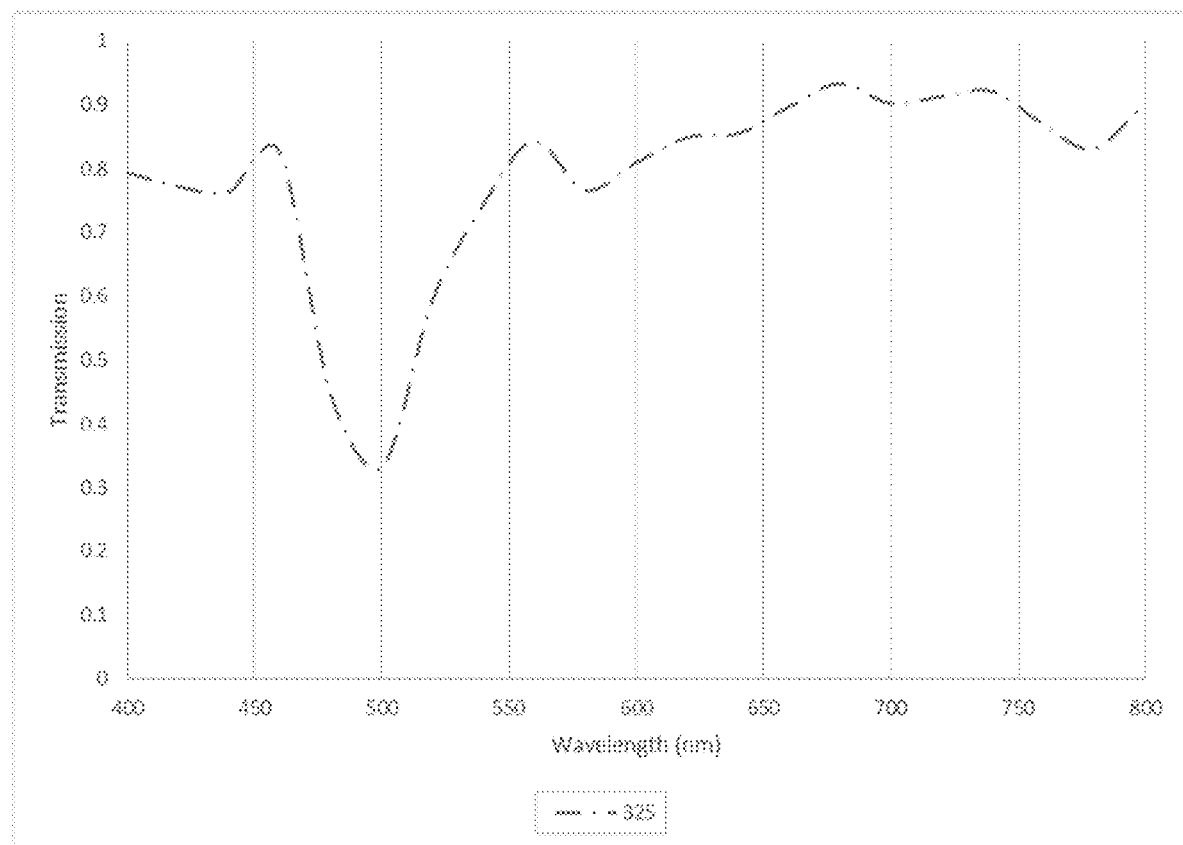

FIGS. 12 through 19 respectively illustrate a relationship between the period of a metamaterial and the corresponding optical resonance of resonant particles at wavelengths of 250 nm (FIG. 12), 275 nm (FIG. 14), 300 nm (FIG. 16), and 325 nm (FIG. 18). In the graphs of FIGS. 13, 15, 17, and 19, which correspond to four different simulations where the period of the metamaterial is modified by an EAP substrate, transmission is represented on the y-axis, whereas wavelength is represented on the x-axis. As the period of the metamaterial is increased, broadening of the resonance is increased, and the optical resonance is broadened. While the disclosed examples respectively describe a metamaterial that is expanding to modify transmission or intensity, the phase may also be modified.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present disclosure may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A tunable optical metamaterial system, comprising:
tunable optical metamaterial having a substrate composed at least in part of an electroactive polymer (EAP) and which is configured to expand when electrically activated, and an optically active particle array comprising a plurality of optically active elongated members populated spaced apart on the substrate in two or more orientations to form confocal lenses that are optically responsive to the expansion of the substrate; and
a control module, including one or more processors to execute a set of instructions to:
control the optical properties of the tunable optical metamaterial by causing the electrical activation of the substrate to selectively expand the substrate in a manner that alters the spacing between the optically active elongated members.

2. The tunable optical metamaterial system of claim 1, further comprising an actuator module coupled to the substrate, the actuator module having one or more electrical conductor members electrically coupled to the substrate to electrically activate the substrate through application of a predetermined voltage.

3. The tunable optical metamaterial system of claim 2, wherein the one or more processors are to execute the set of instructions to cause the one or more electrical conductors to apply the predetermined voltage in a manner that bidirectionally expands the substrate.

4. The tunable optical metamaterial system of claim 2, wherein the one or more processors are to execute the set of instructions to cause the one or more electrical conductors to apply the predetermined voltage in a manner that unidirectionally expands the substrate.

5. The tunable optical metamaterial system of claim 2, wherein the one or more processors are to execute the set of instructions to cause the one or more electrical conductors to apply the predetermined voltage in a manner that expands the substrate in a direction dependent upon an orientation of polymer fibers of the EAP.

6. The tunable optical metamaterial system of claim 1, wherein the optically active elongated members are populated on the substrate in an asymmetric orientation.

7. The tunable optical metamaterial system of claim 1, wherein the optically active elongated members are populated on the substrate in a symmetric orientation.

8. A tunable optical metamaterial, comprising:
a substrate composed at least in part of an electroactive polymer (EAP) that is configured to expand when electrically activated; and
an optically active particle array comprising a plurality of optically active elongated members populated spaced apart on the substrate in two or more orientations to form confocal lenses that are optically responsive to the expansion of the substrate,
wherein the optical properties of the tunable optical metamaterial are controllable by the electrical activation of the substrate to selectively expand the substrate in a manner that alters the spacing between the optically active elongated members.

9. The tunable optical metamaterial of claim 8, wherein the substrate is electrically activated through application of a predetermined voltage thereto.

10. The tunable optical metamaterial of claim 9, wherein the application of the predetermined voltage bidirectionally expands the substrate.

11. The tunable optical metamaterial of claim 9, wherein the application of the predetermined voltage unidirectionally expands the substrate.

12. The tunable optical metamaterial of claim 9, wherein the application of the predetermined voltage expands the substrate in a direction dependent upon an orientation of polymer fibers of the EAP.

13. The tunable optical metamaterial of claim 8, wherein the optically active elongated members are populated on the substrate in an asymmetric orientation.

14. The tunable optical metamaterial of claim 8, wherein the optically active elongated members are populated on the substrate in a symmetric orientation.

15. A method of controlling a tunable optical metamaterial, the method comprising:
providing the tunable optical metamaterial having substrate composed at least in part of an electroactive polymer (EAP) and which is configured to expand when electrically activated, and an optically active particle array comprising a plurality of optically active elongated members populated on the substrate in two or more orientations to form confocal lenses that are optically responsive to the expansion of the substrate; and
controlling the optical properties of the tunable optical metamaterial by causing the electrical activation of the substrate to selectively expand the substrate to the active state in a manner that alters the spacing between the optically active elongated members.

16. The method of claim 15, wherein the control of the optical properties comprises applying a predetermined voltage to the substrate.

17. The method of claim 16, wherein the control of the optical properties comprises applying the predetermined voltage to bidirectionally expand the substrate.

18. The method of claim 16, wherein the control of the optical properties comprises applying the predetermined voltage to unidirectionally expand the substrate.

19. The method of claim 16, wherein the control of the optical properties comprises applying the predetermined voltage to expand the substrate in a direction dependent upon an orientation of polymer fibers of the EAP.

20. The method of claim 15, wherein providing the tunable optical metamaterial comprises populating the optically active elongated members in symmetric orientation.

* * * * *